May 19, 1970  E. C. SAKSHAUG ET AL  3,513,354
LIGHTNING ARRESTER WITH HIGH SURGE ENERGY ABSORBING CAPABILITY
Filed March 20, 1967  6 Sheets-Sheet 1
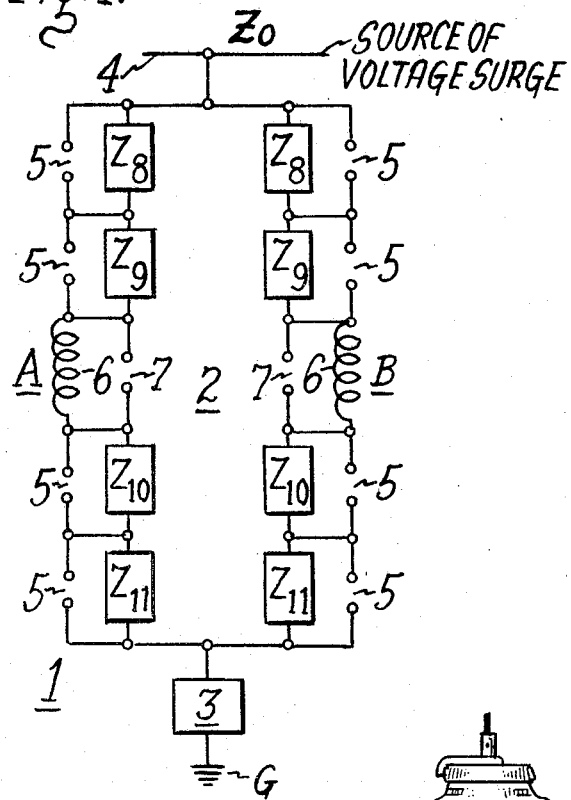
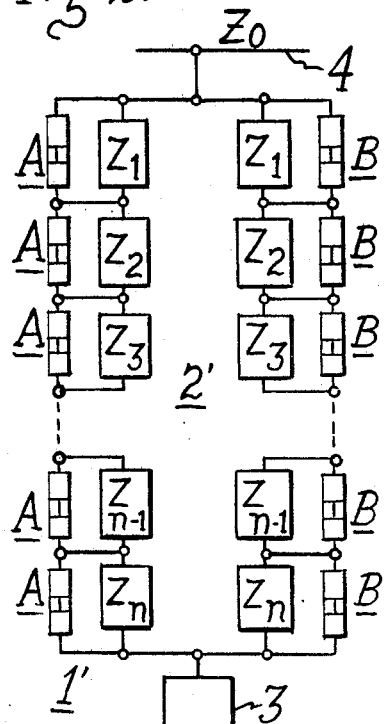
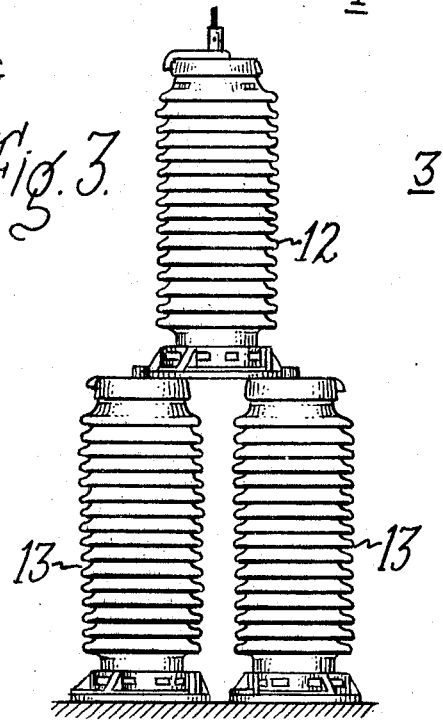
Inventors,
Eugene C. Sakshaug,
James S. Kresge,
by Gilbert P. Tarleton
Their Attorney.

Inventors,
Eugene C. Sakshaug,
James S. Kresge,
by their Attorney

Inventors,
Eugene C. Sakshaug,
James S. Kresge,
by *(signature)*
Their Attorney.

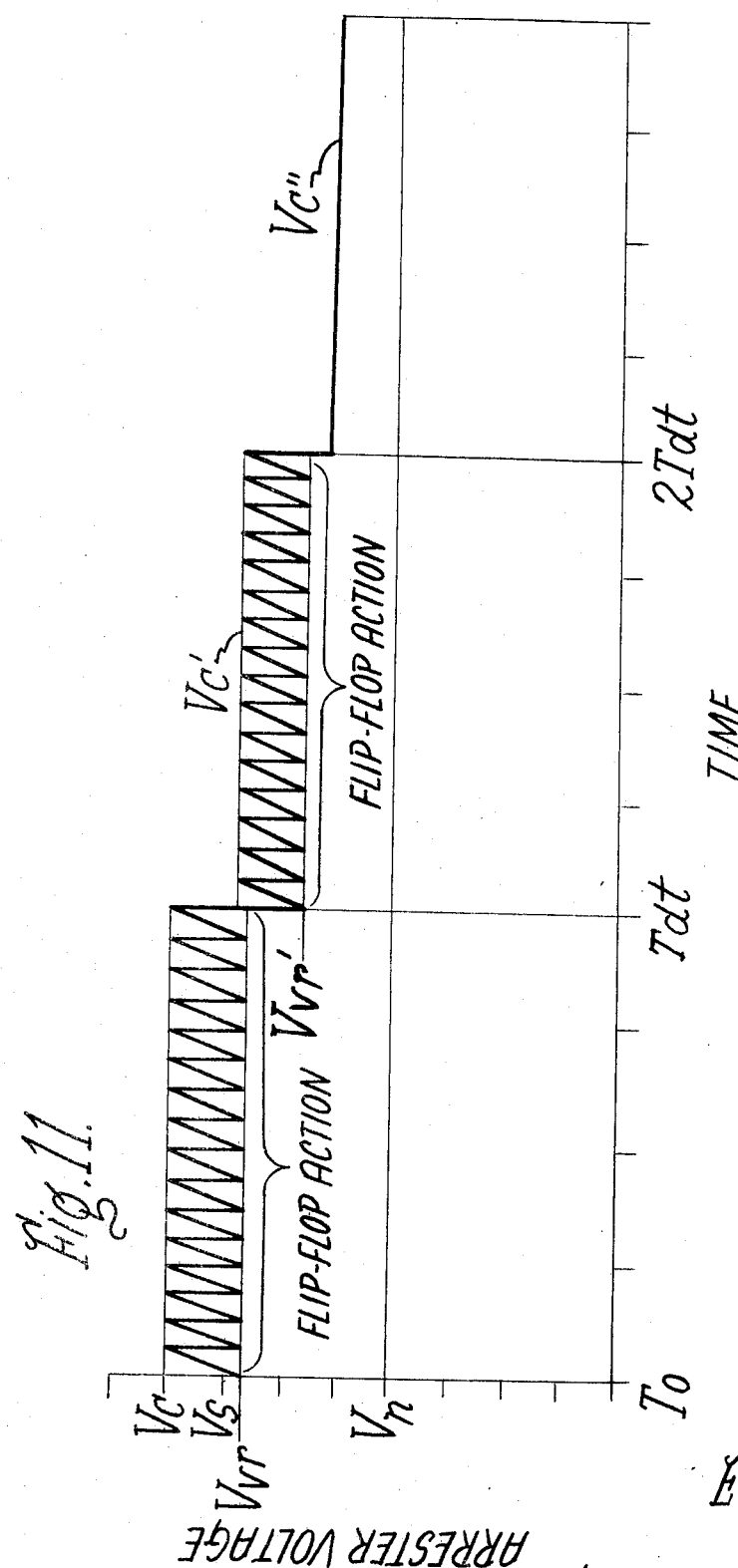

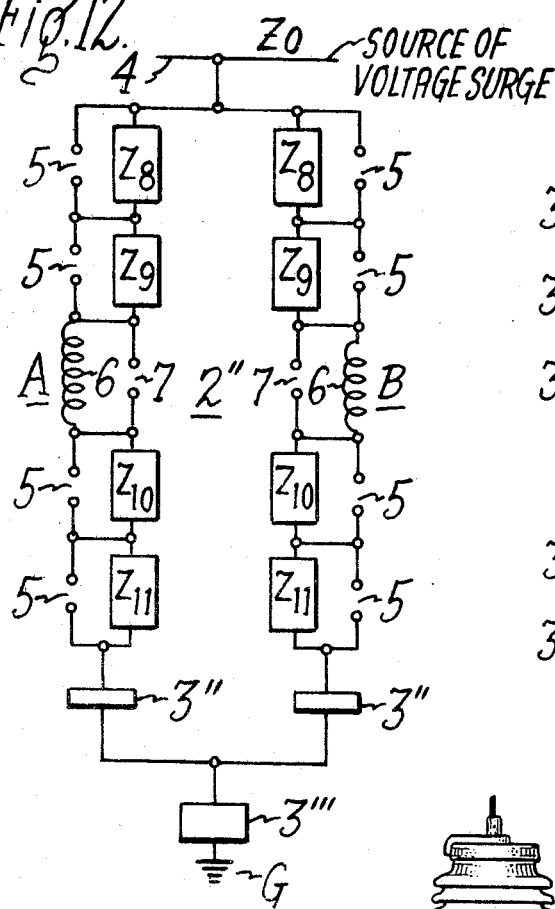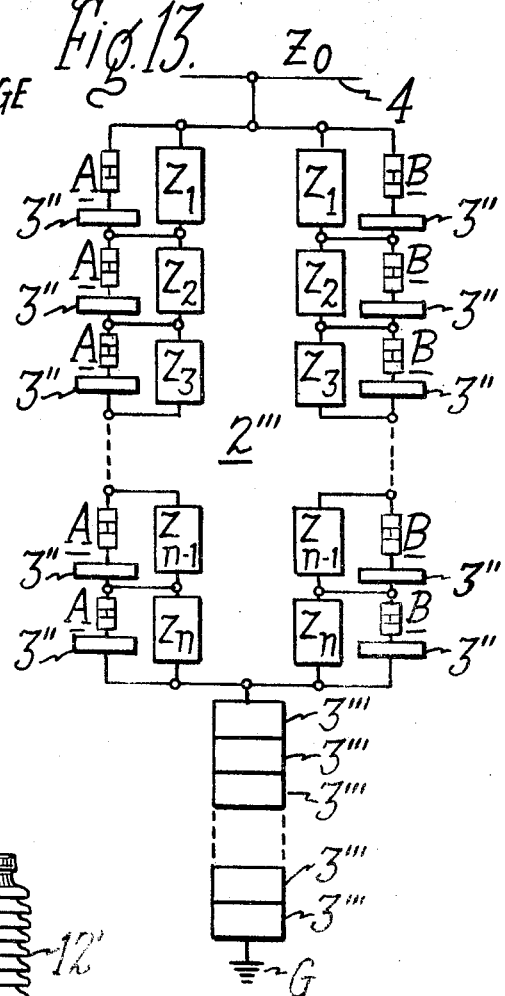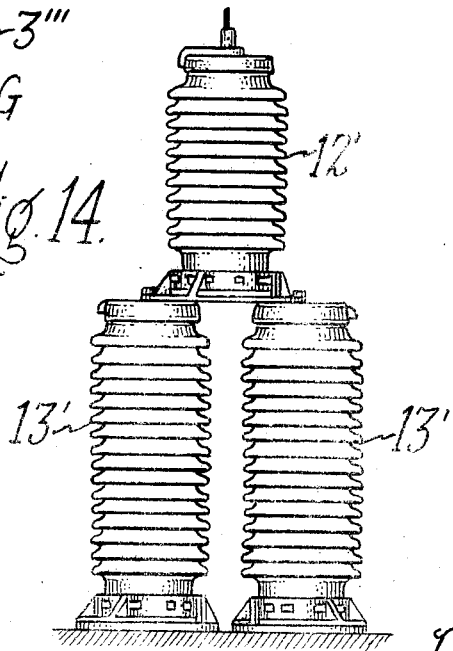

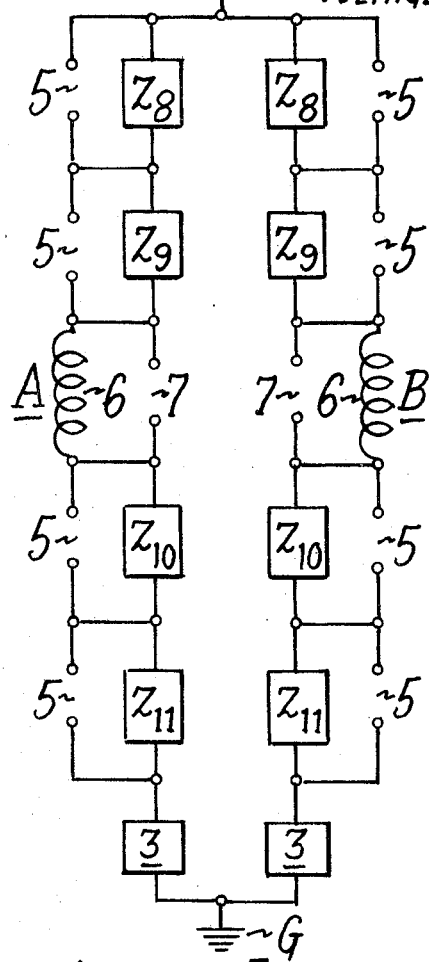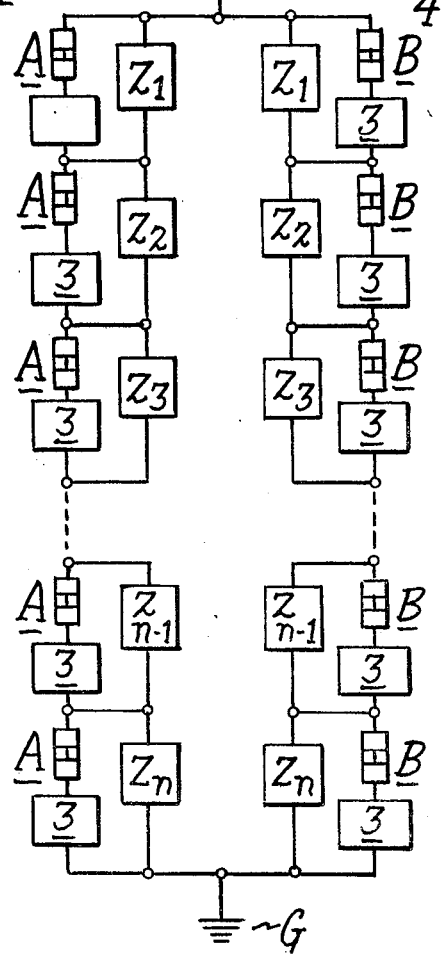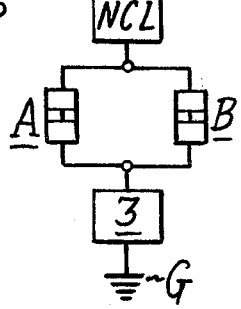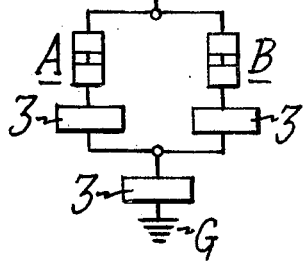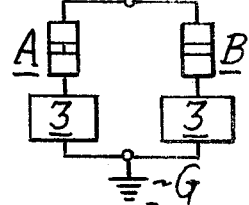

United States Patent Office 3,513,354
Patented May 19, 1970

3,513,354
LIGHTNING ARRESTER WITH HIGH SURGE ENERGY ABSORBING CAPABILITY
Eugene C. Sakshaug, Lanesborough, and James S. Kresge, Pittsfield, Mass., assignors to General Electric Company, a corporation of New York
Continuation-in-part of application Ser. No. 553,413, May 27, 1966. This application Mar. 20, 1967, Ser. No. 624,297
Int. Cl. H02h 3/22, 9/06
U.S. Cl. 317—61          31 Claims

ABSTRACT OF THE DISCLOSURE

A high energy surge absorbing lightning arrester comprising a pair of current limiting gaps connected in parallel circuit relation to produce a flip-flop mode of operation. Valve resistance may be common to and in series with the parallel circuits or distributed serially in the parallel circuits or both. A common non-current limiting gap may also be connected in series with the parallel circuits.

---

Figure 4:
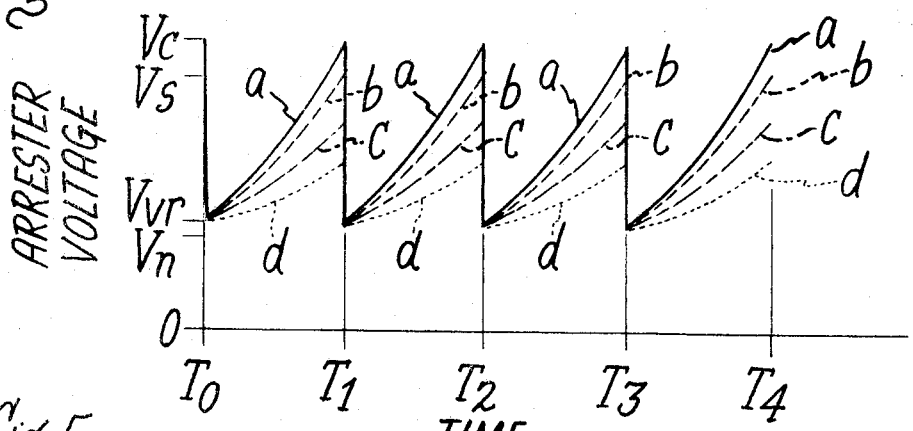

This is a continuation-in-part of our original application Ser. No. 553,413 filed May 27, 1966 and now abandoned.

This invention relates to lightning or other surge arresters and more particularly to improvements in surge arresters capable of discharging high energy long duration surges.

The teachings of this invention are particularly applicable to direct current systems, especially high voltage direct current power transmission systems, but they are also directly applicable to arresters for alternating current circuits involving high overvoltages on very long lines, or other AC applications in which the arrester is called upon to discharge high energies over long periods of time (e.g. repetitive overvoltages on successive half cycles either at normal system frequency or at some resonant frequency in an AC system).

Two of the major things required of any arrester are the ability to discharge the energy associated with an overvoltage on the system it is protecting and then clear against and hold off the normal operating voltage of the system. For alternating current systems, arresters up to a few years ago relied upon the fact that a normal current zero occurs twice per cycle, during which time deionization and clearing was accomplished. More recently such arresters have been made utilizing so-called current limiting gaps capable of rapidly building a very substantial countervoltage, much greater than their voltage immediately after sparkover, opposing the normal system voltage thus forcing an artificial current zero during which the arrester can clear. Examples of such a current limiting gap are disclosed in Pat. 3,151,273 granted Sept. 29, 1964 on an application of Stetson et al., and in an application Ser. No. 380,422 of E. W. Stetson filed July 6, 1964, now Pat. 3,354,345 dated Nov. 21, 1967 assigned to the present assignee. As used above and hereinafter in describing the present invention the phrase, "current limiting gap," is intended to define a spark gap or assembly of several spark gaps including means for electrodynamically moving one or more arcs therein to lengthen or cool the arc or arcs thereby raising the arc voltage to a value exceeding the breakdown voltage rating of the gap or gap assembly.

The development of the current limiting gap in its modern form has opened the way toward producing a practical high voltage direct current arrester because of the greater capability of such gaps to force a current zero in a system in which one would not normally exist. In fact, a current limiting arrester having a gap nominally rated at 6 kv. RMS AC is capable of interrupting against 6 kv. DC after passing short duration impulse surges such as are produced by lightning. Basically what this means is that such an arrester could be applied as a lightning arrester on a direct current system where the direct current voltage is no higher than the alternating current voltage rating of the arrester.

Trouble, however, is encountered when such an arrester on a direct current system is called upon to discharge long duration high energy surges such as may be encountered during switching operations or system malfunction. When called upon to discharge for longer than about a millisecond (a time somewhat longer than that required for the current limiting gap to generate the maximum voltage it can generate) the gap quickly begins to overheat and consequently loses its ability to build or maintain sufficient voltage for the arrester to clear the direct current circuit. Arrester failure is the ultimate result. For application on present day and future DC systems long duration discharge capability is essential because it is physically impossible to discharge the long lines involved in a discharge interval lasting less than many milliseconds.

As a solution of this problem of high energy or long duration direct current discharge capability without loss of direct current clearing capability, there has been conceived in accordance with this invention the idea of connecting two current limiting gaps in parallel circuit relation to produce a flip-flop action in which the gaps discharge alternately and each gap is discharging only for comparatively short spaced time intervals whose sum is only about half the duration of the surge. This concept is unobvious because the teaching of the prior art is that current limiting gaps will not operate in parallel in the stable manner heretofore sought after, because of their negative resistance characteristic. Actually that teaching is still valid and the current limiting gaps used in practicing the present invention do not and cannot operate in parallel in the conventional sense of dividing the total current between a plurality of simultaneously activated discharge paths. What they do is divide the total time duration of the discharged surge into shorter time intervals during which each gap alternately carries the total current while the other one is cooling off. In this way they each preserve their maximum clearing ability for use after the surge has been absorbed by the resistor regardless of how long the surge lasted.

An object of the invention is to provide a new and improved lightning arrester.

Another object of the invention is to provide a new and improved high surge energy absorbing direct current surge arrester.

A further object of the invention is to provide a new and improved extra high voltage direct current lightning arrester.

The invention will be better understood from the following description taken in connection with the accompanying drawings and its scope will be pointed out in the appended claims.

In the drawings:

FIG. 1 is a schematic representation of a lightning arrester embodying the invention, FIG. 2 is a similar representation of a higher voltage lightning arrester than that shown in FIG. 1, FIG. 3 is an elevation view of the lightning arresters schematically illustrated in FIGS. 1 and 2, FIGS. 4 through 11 are graphs for explaining the operation of the invention, FIGS. 12, 13 and 14 are modifications of FIGS. 1, 2, and 3 respectively in which some of the valve resistance is distributed in the parallel flip-flop circuits, FIGS. 15 and 16 are modifications of FIGS. 11 and 12 respectively in which all of the valve resistance is distributed serially in the parallel flip-flop circuits, FIG. 17 is another modification of FIG. 1 in which a non-current limiting gap is connected in series with the parallel current limiting flip-flop gaps and a common valve resistor, FIG. 18 is a modification of FIG. 17 in which some of the valve resistance is serially common to the parallel flip-flop gap circuits and the rest of the valve resistance is distributed serially and equally in the parallel flip-flop gap circuits, and FIG. 19 is a modification of FIG. 18 in which there is no common valve resistor and all the valve resistance is placed serially in the parallel flip-flop gap circuits.

Referring now to the drawings, there is shown in FIG. 1 by way of example a lightning or surge arrester $\underline{1}$ of the valve type having a current limiting gap assembly portion $\underline{2}$ and a valve resistor portion $\underline{3}$ serially connected between a conductor 4 of a power system and ground G. The line conductor 4 shown for this example has a surge impedance $Z_o$ and its system will be understood to contain a source of voltage surges such as conventional switching equipment (not shown). Although in most applications a surge impedance appears between the source voltage and the arrester this is not a necessary condition for proper arrester operation. For example, in some applications it may be desirable to place a capacitor directly across the arrester. This in effect becomes a source of voltage with negligible impedance and the presence of this capacitor will not adversely influence the operation of the arrester.

The system may be a direct current system and the current limiting gap portion $\underline{2}$ of the arrester differs from that of a conventional alternating current limiting arrester in that it has two similar current limiting gap assemblies or multi-gap units A and B connected in parallel. As shown by way of example, each comprises four main gaps 5 serially connected with each other and with a magnetic arc blowout coil 6 which is shunted by a protective gap 7 whose arc is also blown out or elongated by the magnet-coil 6. In general, the organization and structure of these gaps and the coil may be similar to the subject matter of the above referred to Stetson et al. patent or Stetson application in which the gap electrodes have runners and the electrodes are sandwiched between porous insulating plates for producing very rapid and very pronounced build up of arc voltage due to the interaction between the flux of the coil 6 on all of the arcs of all of the gaps and the interaction of the voltage of the shunt gap 7 on the coil 6. Accordingly, it will be understood that when, for the sake of convenience and to facilitate an easier understanding of the invention, reference is made hereinafter to "gap A," "gap B" or simply to "gap" or "gaps," respectively, it is intended to mean a current limiting gap assembly means of the type described in the patent and application just mentioned or a suitable equivalent thereof, except in those instances where a non-current limiting gap is specifically described, as is done below with reference to FIGS. 17, 18 and 19 of the drawings.

In addition, the gap assemblies A and B are provided with so-called upset grading means shown as grading impedances $Z_8$, $Z_9$, $Z_{10}$, and $Z_{11}$ which reduce the transient or surge sparkover voltage level of each assembly to a value substantially below the countervoltage which the assembly is capable of generating during the flow of discharge current. The sparkover action is usually such that main gaps sparkover in cascade or sequence followed by the sparkover of the protective gap 7, this sequential action being very rapid, i.e. a matter of a fraction of a microsecond.

As a consequence of this construction, each current limiting gas assembly after complete sparkover and the beginning of surge current flow therethrough rapidly develops a substantial countervoltage which in the matter of about 500 microseconds can substantially equal its sparkover voltage. However, this countervoltage can and does, go through and well beyond the sparkover voltage because while conducting discharge current the countervoltage generated by each gap, rather than the grading network, controls the voltage distribution between the gaps and makes that voltage distribution essentially linear or uniform instead of being highly nonlinear or nonuniform when the gaps are not conducting and the grading network is controlling the voltage distribution. However, once the gap assembly has developed its full countervoltage the arc is no longer moving along the electrode arc runners but is impinging on the arc interrupting structure of the current limiting gap assembly and thus, as previously mentioned, if operation under these conditions is continued for more than a few milliseconds the gap unit is damaged by over-heating.

The flip-flop action or operation of the parallel gaps A and B of FIG. 1 so as to prevent them from overheating during the discharge of a high energy long duration surge and thus preserve their ability to clear against normal circuit voltage and seal off follow current after the surge has been dissipated can best be understood by reference to the curves labeled $a$ in the accompanying graphs shown in FIGS. 4, 5, 6, 7, 8, 9 and 10 all of which have the same horizontal time scale. While the gaps do develop some voltage during their flip-flop mode of operation and thus do contribute to the dissipation or absorption of a high energy voltage surge on a direct current power system (which may last as long as many milliseconds), this contribution is not substantial because due to this flip-flop mode of operation their average voltage is comparatively low compared to their maximum voltage.

FIG. 4 is a graph of total arrester $\underline{1}$ voltage plotted against time. On the vertical voltage scale, $V_n$ represents the normal operating voltage of the transmission circuit conductor 4. $V_s$ designates the sparkover voltage of each of the gap assemblies A and B, $V_{vr}$ represents the voltage across the arrester valve resistor or resistors during the flow of maximum arrester current immediately after sparkover, and $V_c$ indicates the voltage to which the conductor 4 can be charged by a surge without damaging the system. $V_c$ is shown as being more than twice $V_n$ which is typical of the relationship which can exist on long high voltage DC lines. $T_0$ indicates the time when the voltage of the conductor 4 at the point to which the lightning arrester $\underline{1}$ is connected attains the value $V_s$. At this instant one or the other of the gap assemblies A or B sparks over first and the arrester voltage immediately falls from $V_s$ to essentially $V_{vr}$ because the gap voltage immediately after sparkover is negligible. Conceivably both gaps could spark over simultaneously although that is highly unlikely because it is practically impossible to make two gap assemblies having absolutely identical sparkover voltage characteristics. However, if in the remote chance that both spark over simultaneously their inherent negative resistance or nonlinear volt-ampere characteristic will cause one of them to take all of the current so that the other one will immediately clear.

In what follows, it will be assumed that gap A sparks over first. At time $T_1$ which may be about 500 microseconds after $T_0$ the voltage of gap A, curve $a$, has built up to such a point that the total arrester voltage almost equals the charge voltage $V_c$ on the line which of course forces a near current zero in the arrester as will be shown more clearly by reference to FIGS. 5 and 6 which will be discussed below. As will also be explained later by reference to FIGS. 7, 8, 9 and 10 the gap B will sparkover at time $T_1$ and the gap A will clear. Thus at time $T_1$ the arrester voltage practically instantaneously drops from practically $V_c$ to $V_{vr}$ and then again builds up to almost $V_c$ while gap B is building up voltage until at time $T_2$ the cycle is again repeated, gap A restriking and gap B clearing until $T_3$ when this sequence is again repeated, etc.

Figure 5:
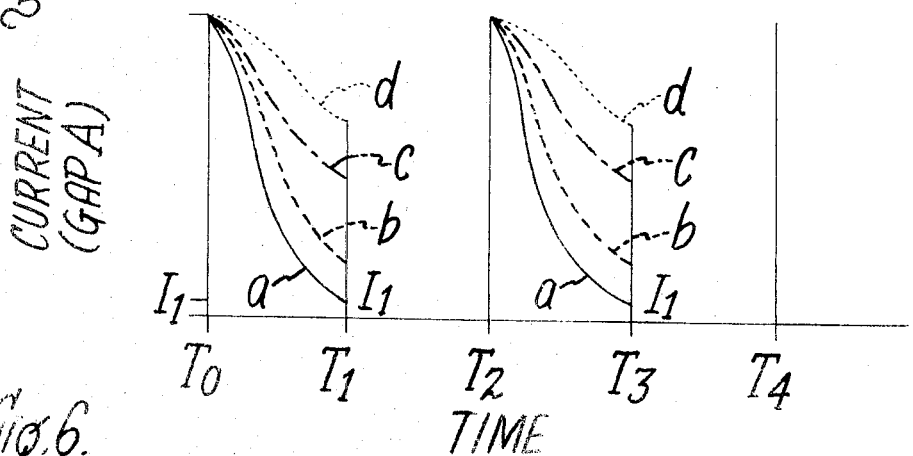

FIG. 5 is a graph of the current in gap A versus time to the same time scale as in FIG. 4 and it shows that at the instant $T_0$ of sparkover of gap A its current practically instantaneously rises from zero to a peak value and then falls progressively along curve $a$ to a very low value $I_1$ at time $T_1$, this of course being caused by the build up of voltage in gap A. As will be explained more clearly in connection with FIGS. 7, 8, 9 and 10, the gap A voltage at time $T_1$ with current $I_1$ in gap A and no current in gap B will be such as to spark over gap B which will immediately cause the current in gap A to drop to zero as shown in FIG. 5, and will immediately cause the current in gap B to increase from zero to its peak value as shown by curve $a$ in FIG. 6 at $T_1$. Thereafter between time $T_1$ and time $T_2$ in FIG. 6, the current in gap B (curve $a$) decreases as its voltage builds up until the current falls to the value of $I_1$ at which time the gap B voltage has risen to the sparkover voltage of gap A which then again sparks over at $T_2$ in FIG. 5 and the current in gap B drops to zero at $T_2$ in FIG. 6, this flip-flop action then being repeated as long as necessary until the line voltage is reduced to a value lower than $V_s$ which can be cleared by the arrester.

Figure 7:
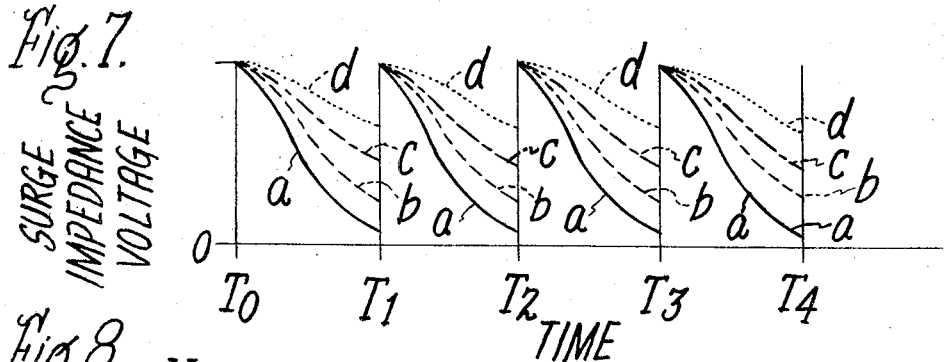
Figure 8:
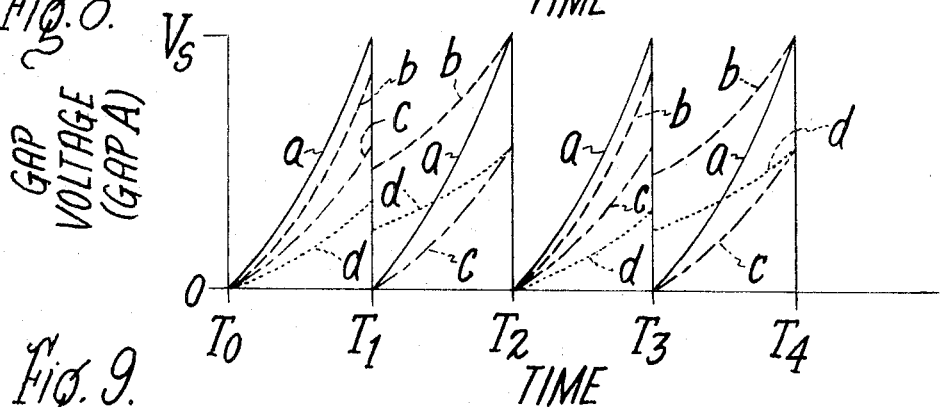
Figure 9:
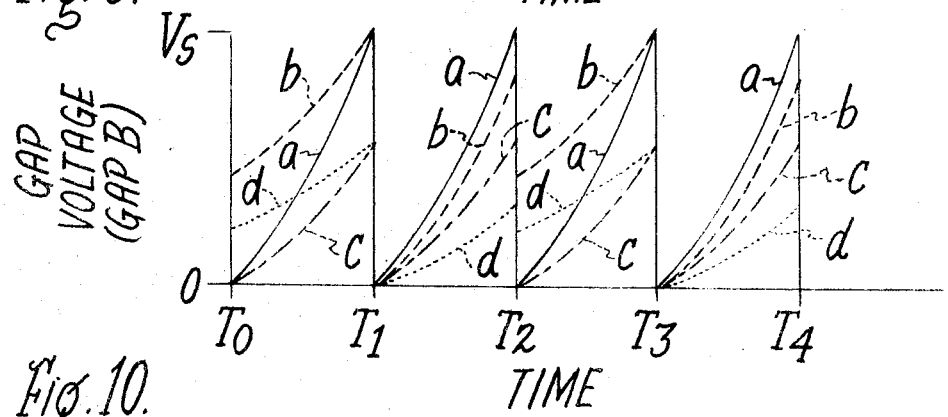

Referring now to FIGS. 7, 8, 9 and 10, these individually represent the three component voltages or voltage drops between the portion of the line conductor 4 which is charged to $V_c$ and zero or ground potential, or stated another way they collectively represent the arrester's overall charge voltage. Thus FIGS. 7, 8, 9 and 10 are graphs respectively of the surge impedance voltage drop in the line due to arrester current flow, the arrester current limiting gap voltage and the arrester valve resistance voltage drop all plotted against a common or the same horizontal time axis. For any common time in FIGS. 7, 8, 9 and 10, the voltages represented by the curves $a$ add up to $V_c$, the charge voltage, except of course that the gap voltages of FIGS. 8 and 9 are not added because the gaps are connected in parallel and thus have the same voltage at each instant, i.e. curves $a$ in FIGS. 8 and 9 are identical.

Figure 6:
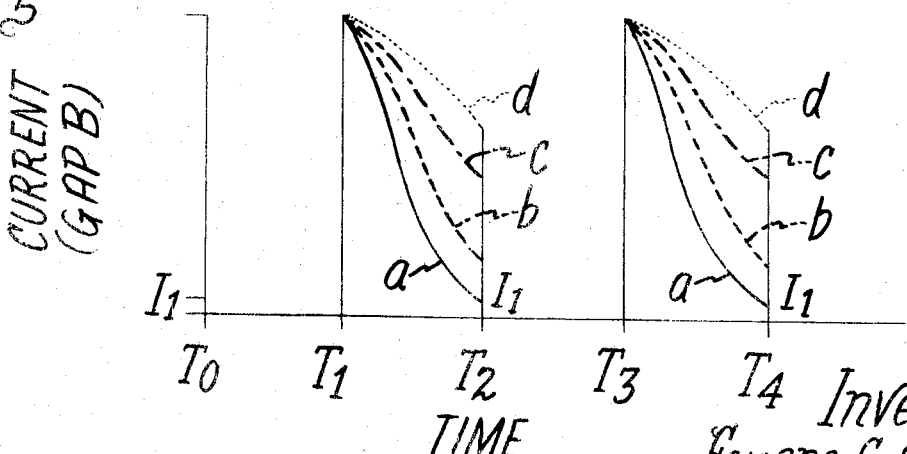

As shown in FIG. 7, the surge impedance voltage (curve $a$) for any time corresponds directly to the arrester or gap current at the same time indicated by curves $a$ in FIGS. 5 and 6 because the surge impedance is a linear impedance so that its voltage drop is directly proportional to the arrester current. However, as shown in FIG. 10, the valve resistor voltage curve $a$ while generally similar to the surge impedance voltage curve is considerably flatter and less curved than the surge impedance voltage curve because of the nonlinear resistance characteristic of the valve resistance material, such nonlinear material being conventional in lightning arresters.

Figure 10:
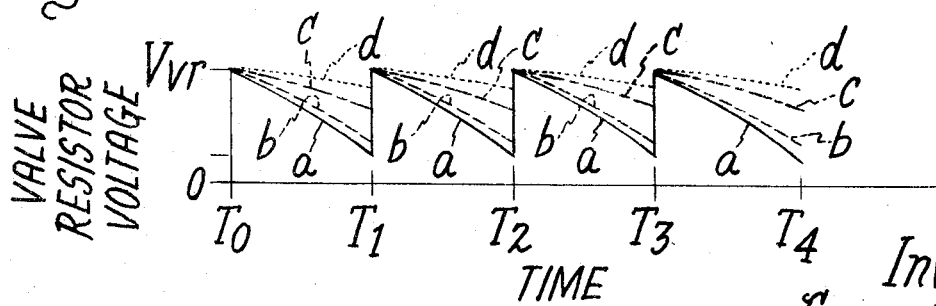

The reason that at times $T_1$, $T_2$, $T_3$ etc., the arrester voltage in FIG. 4 (curve $a$) does not quite equal $V_c$ and the surge impedance and valve resistance voltages (curves $a$) in FIGS. 7 and 10 respectively do not equal zero is because at those times the minimum gap current on curves $a$ is $I_1$ as shown in FIGS. 5 and 6. One reason the minimum voltage of the valve resistor is so much greater than the minimum voltage of the surge impedance at times $T_1$, $T_2$, $T_3$, etc. is that at the low value of current $I_1$ at those times in FIGS. 5 and 6 the resistance of the valve material is very much higher than when it is carrying a higher current.

FIG. 8 shows that at time $T_0$ when gap A has just sparked over its voltage is essentially zero and that its voltage rises rapidly with time until at $T_1$ its voltage equals the gap sparkover voltage $V_s$. At $T_1$ gap B sparks over thus causing the gap voltage instantaneously to drop again essentially to zero. Thereafter between $T_1$ and $T_2$ the voltage of gap B rapidly builds up to the gap sparkover voltage $V_s$ and at $T_2$ the cycle or flip-flop action is repeated through $T_3$, $T_4$, etc. Thus curves $a$ in FIGS. 8 and 9 are the same because the gaps are directly in parallel and must have the same voltage at all times. Under the operating conditions represented in FIGS. 5, 6, 8 and 9 the individual gaps do not heat up at a uniform time rate during their periods of conduction and the rate of heating is only critical near the points where the gap voltage is the highest which is only for a short time in comparison with the time during which each gap is sparked over and is conducting. Consequently, it will be seen from these figures that the critical heating time of each gap is comparatively short with respect to the alternate cooling time of each gap when it is not carrying any current.

FIG. 11 shows an arrester embodying the present invention clearing on an open ended 400 kv. 800-mile direct current line which has been charged to 800 kv. by being suddenly energized at its other end. $T_{dt}$ is the so-called double travel time of the line and in the case of an 800-mile line this would be about 8000 microseconds. During this comparatively long time interval between $T_0$ and $T_{dt}$, the flip-flop action in the arrester is being repeated many times and energy is being drained or discharged or absorbed from the charge on the line by the arrester. However, this has no noticeable effect on the voltage at the point on the line to which the arrester is connected until time $T_{dt}$ when the voltage reduction caused by the first period of conductivity of gap A has traveled to the open end of the line and has been reflected back to the point to which the arrester is connected. At this instant the charge voltage drops and as shown by way of example it drops to a value $V_{c'}$ in the neighborhood of $V_s$. Due to the comparatively long continued operation of the arrester, the sparkover voltage of its gaps may temporarily be somewhat reduced so even if the charge voltage $V_{c'}$ as shown drops slightly below the normal sparkover voltage $V_s$ of the arrester, the arrester may still spark over and this action will then be repeated in a flip-flop manner to time $2T_{dt}$ whereupon the charge voltage will again drop to say $V_{c''}$, this time perhaps to a value low enough so that the arrester gaps will not spark over and thus the arrester will clear, as shown against a line voltage $V_{c''}$ somewhat lower than $V_s$ but well above the normal line voltage $V_n$. As shown in FIG. 11, this still leaves a charge voltage $V_{c''}$ on the line, i.e., a voltage above $V_n$. This however, is not harmful to the system insulation and it will gradually be reduced or discharged by leakage paths such for example as the leakage path through the lightning arrester grading impedances so that in a matter of minutes the line voltage will return to or attain its normal value of $V_n$. The number of double travel times ($T_{dt}$) required for the arrester to clear is determined by the magnitude of the initial charge voltage on the line and the magnitude of the current drawn from the line while the arrester is discharging as determined by the resistance of the valve material. By way of example, FIG. 11 shows the arrester clearing after two double travel times, but in a practical arrester the number could be as few as one or as many as perhaps five or even ten.

The reason for the decreased amplitude of the voltage variations between $T_{dt}$ and $2T_{dt}$ is, of course, that the charge voltage $V_{c'}$ is lower which decreases the magnitude of the discharge current through the arrester and consequently the arrester resistance voltage drop $V_{vr'}$.

It will be noted that the arrester voltage fluctuations during flip-flop action are relatively much smaller in FIG. 11 than in FIG. 4 (curve $a$). This is because the arrester for which the waveform of FIG. 11 would be applicable contains appreciably more valve resistance than the one for FIG. 4. Thus the discharge current is relatively lower and hence the fluctuations in arrester voltage are smaller. This was done purposely for this illustration to demonstrate the manner in which the arrester may take several reflection times of the line to clear. The arrester of FIG. 4 (curve $a$) would more likely clear at time $T_{dt}$ because the greater magnitude of discharge current will remove energy from the line at a faster rate, causing a much greater decrease in line charge voltage at that time. The magnitude of valve resistance in any particular case is largely determined by the parameters of the system in which it is to be used and by the protective level which must be maintained. As illustrated, considerable latitude in the amount of valve resistance used may be exercised by the designer in applying the principles of this invention.

In the case of a lightning surge, the arrester will operate like a conventional current limiting arrester and as the duration of a lightning surge is much less than the time required for whichever gap is sparked over by the lightning surge to build up its voltage to a value above $V_n$ the arrester will clear follow current before time $T_1$ which is much less than the time of a half cycle at 60 cycles per second required by many conventional alternating current arresters.

For system voltages higher than can be cleared by the arrester shown in FIG. 1, it might be assumed that FIG. 1 could be used as a sample building block or module for a higher voltage arrester by simply connecting any desired number of them in series. However, this is impractical and such a system would not operate because there is no reason why the flip-flop action in the various modules would stay in synchronism and if they did not stay in synchronism this might result in destruction of such an arrester. One way to extend the flip-flop principle of FIG. 1 to higher voltages is shown in FIG. 2 in which all of the gaps are placed in two separate columns, connected only at their extreme ends, and with all of the series valve resistor material outside of the gap portion. In this arrangement, all of the gaps A must stay in synchronism since they are all carrying a common current, and likewise all of the gaps B must stay in synchronism as they are all carrying a common current. The flip-flop action at a uniform rate is thus assured just as it was for FIG. 1. This figure also shows a grading circuit $Z_1$–$Z_n$ across the gap assemblies (commonly called the major grading circuit) which may provide either uniform or nonuniform grading of the applied voltage among the gap assemblies.

FIG. 3 illustrates the appearance and construction of an arrester having a circuit similar to FIG. 1 or FIG. 2. In FIG. 3 an insulator housing 12 for the valve resistance material 3 or 3' is placed on top of and in contact with the two parallel similar insulator housings 13, one of which contains the gap element or elements A and the other of which contains the gap element or elements B. Insulator housings 13 collectively contain the flip-flop gap portion 2 or 2' of the arrester. It would be possible to place the gap element or elements A and B in one common housing but such a housing would have to be large enough to contain the gap columns and keep them electrically isolated from each other except at their extreme ends.

One undesirable feature of FIG. 3 is that it is inefficient in the use of housings because the housing part 12 which contains the series valve resistor material does not support any of the normal operating voltage. Accordingly, the present invention also contemplates interspersing any suitable fraction of the total valve resistance material in the gap columns, such for example as enough to maintain a net negative resistance characteristic of such interspersed gap columns, while keeping the remaining valve resistance material in a separate series or common portion, preferably in a separate housing. In this manner, the theoretical possibility of undesirable parallel operation of the gap columns is avoided while improving the contamination performance of the arrester by using more of the housing length for holding off the applied voltage.

Examples of such modifications are shown in FIGS. 12, 13 and 14 which are generally similar to FIGS. 1, 2, and 3. Thus in FIG. 12, fractional portions 3'' of the valve resistance material are placed in series with the respective gaps A and B and the remainder of the resistance material 3''' is connected in series with the parallel combination. FIG. 13 shows how this idea is extended to the higher voltage rating arresters by interspersing fractional portions 3'' of the resistance material in the respective gap columns and thus reducing the amount of the remaining common resistance material 3''' which is in series with the parallel gap columns.

A further advantage of the circuit arrangements of FIGS. 12 and 13 is that by placing resistance material in the gap columns the voltage of the gap columns when they are carrying current is higher than the voltage across the gap or gaps alone in each column. Consequently, the point of current transfer from one gap column to the other during the flip-flop action can take place when the sparked over gap column whose gaps are building voltage is carrying an appreciable amount of current because the gaps of the parallel unsparked over column will have impressed on them the entire voltage of the current carrying gap column including its resistor voltage drops. In other words, use can be made of a small amount of resistance to reduce the maximum voltage across the arrester and thereby improve its insulation protective characteristics.

FIG. 14 shows, in comparison with FIG. 3, how the various housing lengths and the overall height of the arrester having the circuits of FIGS. 12 or 13 can be reduced in comparison with equal voltage rating arresters having the circuits of FIGS. 1 or 2.

In an attempt further to improve the protective characteristics of the arrester all of the valve resistance material was placed in series with the flip-flop current limiting gaps A and B as shown in FIG. 15 for a single module comparatively low voltage arrester and in FIG. 16 for a higher voltage arrester having a plurality of serially interspersed current limiting gaps and voltage resistors in each flip-flop gap column and with no common valve resistance. These circuits amount to paralleling two special current limiting arresters each comprising a current limiting gap or gaps in series with the needed valve resistor or resistors and with no common valve resistor.

It is important to note that this invention relies upon the ability of columns of gaps and valve resistors to build a voltage during a long duration discharge in excess of the sparkover voltage. Of necessity this is not allowable for conventional arresters because otherwise the protective level would be exceeded during long duration discharges.

Quite unexpectedly it was found that these circuits also have a flip-flop mode of operation although sometimes there may be an initial transient condition in which both arresters or parallel branches carry current at the same time. However, in that case one gap or branch will (or can easily be made to) always build voltage faster than the other and will then clear and interrupt its current. It will then immediately restrike and in so doing clear the other arrester or branch. The circuit will then be in its flip-flop mode of operation.

In terms of the presently preferred physical structure of the current limiting gaps disclosed in the above referred to Stetson application what happens is that the gaps do not really begin to develop high voltage until their arcs are driven into the teeth and results indicate that this does not occur simultaneously in both gaps. Consequently, the gap whose arc first strikes the teeth will develop the highest voltage first thus forcing the major portion of the total current into the other or parallel gap and this high current produces a fatter arc in that high current carrying gap and this fatter arc has more difficulty in entering the teeth so that further voltage build up is inhibited in that gap. This action will continue until the high voltage low current gap develops a voltage which exceeds the voltage of the low voltage high current gap plus the IR drop in the latter's series resistance. When this happens, the first or high voltage gap clears and its arc goes out just as any other current limiting valve type arrester will clear. The arrester is now in its flip-flop mode as previously described and flip-flop action will continue until the surge passes.

It is important to note that getting out of parallel operation is dependent on a transient phenomenon as the arcs first strike the teeth in the gap plates.

Conceivably the arcs could strike the teeth simultaneously in each gap in which case it is conceivable that parallel operation could continue and the circuit not go into its flip-flop mode. This could easily be prevented by a slightly different design of the two gaps so that one would always build voltage faster than the other. This could be done for example by a different spacing between the teeth or a different design of or a different spacing between the plates. The use of such an arrangement of teeth or a particular plate spacing to control the rate of voltage build-up in the gaps during the discharge of high current surges in a separate invention which is not claimed herein.

A characteristic of FIGS. 15 and 16 is that flip-flop action will occur at gap voltages very much less than the maximum voltages they can build or very much less than the voltages necessary to insure dynamic instability of parallel operation so as to force the circuit into its flip-flop mode. For example, the gaps may be capable of generating voltages of 16 kv. but due to the presence of a substantial amount of resistance in series with each gap the flip-flop action can occur around 7 kv.

For further explaining the operation of FIGS. 15 or 16 and comparing it with the operation of FIGS. 1 or 2, the curves labeled $b$ in FIGS. 4–10 inclusive, are the characteristic curves for FIGS. 15 or 16. In FIG. 4 it will be noted that the peak arrester voltage for curve $b$ has been significantly lowered below that for curve $a$ and significantly below the line charge voltage $V_c$. In FIGS. 5 and 6, it will be noted that the gap current when flipping and flopping or at the instant of current transfer has been materially increased from the value $I_1$ for curve $a$.

In FIG. 7 it will be noted from curve $b$ that the surge impedance voltage does not cyclically fall to as low a value or to anywhere near zero as it does for curve $a$. This, of course, being because the arrester current does not fall to such low values.

In FIGS. 8 and 9 curves $b$ show that the gap voltages are materially different depending upon whether the gap is or is not carrying current, as distinguished from curves $a$ which are the same whether or not the gaps are carrying current. This difference is, of course, the result of the substantial amount of resistance in the flip-flop circuits which means that the gap that is not carrying current sees a voltage which is materially higher than the voltage of the gap which is carrying current and in fact sees the latter voltage plus the IR drop in the resistance in series with the latter.

In FIG. 10 curve $b$ shows that the average and minimum resistor voltages stay higher than for curve $a$ because of course their average and minimum currents at the point of transfer are higher.

Returning briefly to FIGS. 12 and 13, it will be apparent from the foregoing that the characteristic curves for these figures will be between the curves $a$ and $b$ in FIGS. 4–10 because of course in FIGS. 12 and 13 there is some common resistance corresponding to FIGS. 1 and 2 and some branch circuit resistance corresponding in part to FIGS. 15 and 16.

Another way of reducing the protective voltage level of the arrester relative to the line charge voltage is to use only enough current limiting flip-flop gaps to assure clearing ability against the normal or rated circuit voltage and increase the sparkover voltage to or near the desired protective level by means of a common series non-current limiting gap or gaps so that the arrester will not operate excessively often on frequent but non-dangerous overvoltages due to normal system disturbances. FIG. 17 is an elementary schematic representation of such an arrester with all the series valve resistance common to the current limiting flip-flop gaps. For higher voltages, there will be additional series resistors and gaps of both the current limiting and non-current limiting kind, in the same way that FIG. 2 modifies FIG. 1.

The non-current limiting gap or gaps may be of any suitable or well known type, a preferred form being described in Stetson Pat. 3,259,780 dated July 5, 1966 and assigned to the same assignee.

The comparative performance curves for FIG. 17 are labeled $c$ in FIGS. 4–10 from which the operation will be clear.

In the modification of FIG. 17 shown in FIG. 18 half the valve resistance is common and half is placed in each parallel flip-flop current limiting gap circuit. This gives still lower arrester voltage as shown by curves $d$ in FIG. 4 and explained by curves $d$ in FIGS. 5–10.

In the further modification shown in FIG. 19 all of the valve resistance is placed in each of the parallel branch current limiting gap flip-flop circuits. This will give still lower arrester voltage and while no performance curves have been shown for it in FIGS. 4–10 they can easily be visualized by extrapolation and they would lie on the opposite side of the $d$ curves from the $c$ curves.

It will of course be obvious that FIGS. 18 and 19 can be modified for higher voltages in the same way that FIG. 13 modifies FIG. 12 and FIG. 16 modifies FIG. 15 respectively.

The circuits of FIGS. 17, 18 and 19 and to a lesser extent FIGS. 12, 13, 15 and 16 are also attractive for AC operation because the flip-flop action occurs while the arrester is passing a substantial amount of current as distinguished from FIGS. 1 and 2 where the arrester in effect forces the current to near zero at the instant of transfer in the flip-flop action. In other words, in the circuits of FIGS. 12, 13, 15, 16, 17, 18 and 19 the protected apparatus will not be cyclically subjected by the flip-flop action to the line charge voltage before normal current zero as would be the case for FIGS. 1 and 2.

While there have been shown and described particular embodiments of the invention, it will be obvious to those skilled in the art that changes and modifications may be made without departing from the invention, and therefore it is intended by the appended claims to cover all such changes and modifications as fall within the true spirit and scope of the invention.

What we claim as new and desire to secure by Letters Patent of the United States is:

1. A voltage surge arrester comprising at least two parallel circuits with at least one current limiting gap assembly in each circuit, each said assembly being effective when energized to force rapid transfer of all surge current from its circuit to at least one of the other parallel circuits, whereby surge current through said parallel circuits is forced to flow first entirely through one of said circuits then through another of said circuits thereby to prevent damage to any one of said assemblies by overheating due to uninterrupted passage of surge current through it.

2. An arrester as in claim 1 with a valve resistor in series with each gap assembly.

3. An arrester as in claim 1 with a common valve resistor in series with said parallel circuits.

4. An arrester as in claim 1 with at least one valve resistor serially in each of the parallel circuits.

5. An arrester as in claim 4 with a common valve resistor in series with said parallel circuits.

6. An arrester as in claim 1 whose gap assemblies after sparkover rapidly build a voltage exceeding their sparkover voltage.

7. An arrester as in claim 1 with a plurality of such gap assemblies serially in each circuit.

8. An arrester as in claim 4 in which each of said parallel circuits has a negative resistance characteristic.

9. An arrester as in claim 8 in which each of said gap assemblies after sparkover rapidly produces a countervoltage which when added to the voltage drop in its serially connected resistor produces a total voltage which exceeds the sparkover voltage of the other gap assembly.

10. An arrester as in claim 7 with a plurality of valve resistors interspersed serially between the gap assemblies in each circuit.

11. An arrester as in claim 10 with a plurality of common serially connected valve resistors in series with said parallel circuits.

12. A voltage surge arrester comprising, in combination, similar adjacent vertical insulator housings each containing a like number of serially connected current limiting spark gap assemblies, and a single vertical insulator housing containing valve resistance material and supported at its bottom end by the top ends of both of the first mentioned housings, said current limiting gap assemblies being connected in parallel with each other and in series with said valve resistance material through the said top and bottom end supporting contacts between their housings.

13. An arrester as in claim 12 in which said similar housings also contain valve resistors serially interspersed electrically between the gap assemblies.

14. An arrester as in claim 4 in which said valve resistors comprise the total valve resistance of said arrester.

15. An arrester as in claim 5 in which each of said parallel circutis has a negative resistance characteristic.

16. An arrester as in claim 10 in which said valve resistors comprise the total valve resistance of said arrester.

17. An arrester as in claim 1 with a non-current limiting gap in series with each current limiting gap assembly.

18. An arrester as in claim 1 with a common non-current limiting gap in series with said parallel circuits.

19. An arrester as in claim 2 with a non-current limiting gap in series with each current limiting gap assembly.

20. An arrester as in claim 3 with a common non-current limiting gap in series with said parallel circuits and in series with said common valve resistor.

21. An arrester as in claim 4 with a common non-current limiting gap in series with said parallel circuits.

22. An arrester as in claim 5 with a common non-current limiting gap in series with said parallel circuits and in series with said common valve resistor.

23. An arrester as in claim 14 with a non-current limiting gap in series with each current limiting gap assembly.

24. An arrester as in claim 14 with a common non-current limiting gap in series with said parallel circuits.

25. An arrester as in claim 2 for a direct current circuit having a normal voltage in which the maximum countervoltage developed by said current limiting gap assemblies is no more than sufficient to clear the arrester by forcing its follow current to zero against said normal voltage.

26. An arrester as in claim 25 with a common non-current limiting series gap for raising the sparkover voltage level of the arrester sufficiently above said normal voltage to prevent unnecessary operation of said arrester in response to normal fluctations in said circuit voltage.

27. An arrester as in claim 1 in which said parallel circuits have significantly different rates of voltage build-up after sparkover of their respective current limiting gap assemblies.

28. An arrester as in claim 1 in which said gap assemblies have significantly different rates of voltage build-up after they spark over.

29. An arrester as in claim 4 in which said parallel circuits have significantly different rates of voltage build-up after sparkover of their respective current limiting gap assemblies.

30. A voltage surge arrester comprising at least two parallel circuits with at least one voltage building gap in each circuit, each said gap being effective when energized to implement transfer of current from its circuit to the other parallel circuit or circuits.

31. A voltage surge arrester comprising at least two parallel circuits, a first means adapted to build-up voltage across one said circuit after sparkover thereof, a second means adapted to build-up voltage across another of said circuits after sparkover thereof, each of said first and second means being effective when operative to implement transfer of current from its circuit into another parallel circuit or circuits.

References Cited

UNITED STATES PATENTS

| | | | |
|---|---|---|---|
| 2,014,179 | 9/1935 | Honaman | 317—61 X |
| 2,600,149 | 6/1952 | Yonkers | 317—61 |
| 2,763,818 | 9/1956 | Beck et al. | 317—61 |
| 3,320,482 | 5/1967 | Sakshaug et al. | 317—69 X |
| 3,094,648 | 6/1963 | Nilsson | 317—70 X |

FOREIGN PATENTS 928,185   5/1952   Germany.

JAMES D. TRAMMELL, Primary Examiner

U.S. Cl. X.R.

315—36, 61.5, 68, 69